United States Patent [19]

Sera et al.

[11] 4,111,926

[45] Sep. 5, 1978

[54] HARDENING AGENT FOR GELATIN AND METHOD FOR HARDENING GELATIN

[75] Inventors: Hidefumi Sera; Hisashi Shiraishi; Tsumoru Ishii, Minami Ashigara, Japan

[73] Assignee: Fuji Photo Film Co., Ltd., Kanagawa, Japan

[21] Appl. No.: 764,506

[22] Filed: Feb. 1, 1977

[30] Foreign Application Priority Data

Feb. 2, 1976 [JP] Japan .................................. 51-10542

[51] Int. Cl.$^2$ .............................................. C09H 7/00
[52] U.S. Cl. .......................................... 260/117; 96/111; 106/125; 260/8
[58] Field of Search ............................ 260/117; 96/111

[56] References Cited

U.S. PATENT DOCUMENTS

| 4,028,320 | 6/1977 | Sera et al. ........................ 260/117 |
| 4,057,538 | 11/1977 | Habu et al. ...................... 260/117 X |
| 4,066,636 | 1/1978 | Sera et al. ........................ 260/117 |
| 4,067,741 | 1/1978 | Bergthaller et al. .................. 96/111 |

OTHER PUBLICATIONS

Tetrahedron Letters, No. 35, pp. 3089-3092, 1974, Itoh et al.

*Primary Examiner*—Howard E. Schain
*Attorney, Agent, or Firm*—Sughrue, Rothwell, Mion, Zinn and Macpeak

[57] ABSTRACT

A hardening agent for gelatin comprising a compound represented by the formula (I):

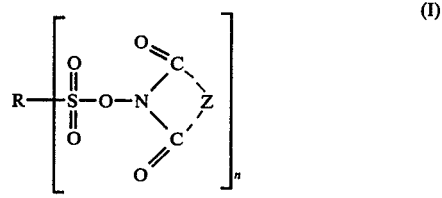

wherein R represents an n-valent organic group, Z represents an atomic group necessary to complete a 5- or 6-membered ring and n represents 1, 2 or 3; and a method for hardening gelatin comprising treating gelatin with a compound represented by the formula (I) above.

13 Claims, No Drawings

HARDENING AGENT FOR GELATIN AND METHOD FOR HARDENING GELATIN

BACKGROUND OF THE INVENTION

1. Field of the Invention

The present invention relates to a hardening agent for gelatin and particularly to a method of hardening gelatin in silver halide photographic light-sensitive materials using an improved gelatin hardening agent.

2. Description of the Prior Art

Gelatin is used as binders for many kinds of photographic light-sensitive materials. For example, the gelatin is used as a main component for silver halide light-sensitive emulsion layers, emulsion protective layers, filter layers, intermediate layers, antihalation layers, backing layers, subbing layers of film bases or baryta layers, etc.

These light-sensitive materials containing the gelatin are processed with various kinds of aqueous solutions, each with a different pH or with a different temperature. The properties of layers containing gelatin which is not processed with a hardening agent depend mainly upon the properties of the gelatin, and such layers have a poor water resistance and the mechanical strength of such layers becomes very low due to excessive swelling in the aqueous solutions. Particularly, in extreme cases, the gelatin layers sometimes dissolve off into the solutions when aqueous solutions at a temperature higher than about 30° C or highly alkaline aqueous solutions are used. These characteristics are fatal defects for layers in photographic light-sensitive materials.

It is known that many compounds are effective for hardening gelatin to improve the water resistance properties, heat resistance properties and scratch resistance properties of gelatin layers.

These compounds are well known as "hardening agents" used in production of photographic light-sensitive materials. For example, aldehyde compounds such as formaldehyde or glutaraldehyde, reactive halogen containing compounds described in U.S. Pat. No. 3,288,775, et al., compounds having ethylenically unsaturated reactive bonds described in U.S. Pat. No. 3,635,718, et al., aziridine compounds described in U.S. Pat. No. 3,017,280, epoxy compounds described in U.S. Pat. No. 3,091,537, halocarboxyaldehydes such as mucochloric acid, dioxanes such as dihydroxydioxane or dichlorodioxane, and inorganic hardening agents, such as chromium alum or zirconium sulfate, etc., are known as gelatin hardening agents.

However, all of these known compounds have some defects. Namely, some have an insufficient hardening function when used for photographic light-sensitive materials, some cause change to occur in quality with the lapse of time because of a hardening function called "post-hardening" which occurs due to a slow hardening reaction with gelatin, some compounds adversely influence the properties of the photographic light-sensitive materials (particularly, increase fogging and reduce sensitivity, etc.), some lose their hardening ability when certain photographic additives are present at the same time or result in a reduction in the functions of these other photographic additives (for example, couplers for color light-sensitive materials), some are difficult to synthesize in a large quantity and some have poor storability because they are unstable themselves.

SUMMARY OF THE INVENTION

An object of the present invention is to provide a novel hardening agent for hardening gelatin.

Another object of the present invention is to provide a gelatin hardening agent having an immediate effect for producing photographic light-sensitive materials having stable properties, namely, a low swelling rate and a small degree of swelling of the light-sensitive materials and very small variations in sensitivity and color balance with the lapse of time.

A further object of the present invention is to provide a novel hardening agent which provides excellent water resistance properties, excellent heat resistance properties and excellent scratch resistance properties (particularly, with these characteristics being achieved in aqueous solution at above about 30° C) to gelatin without adversely influencing the photographic light-sensitive materials.

These objects are attained with compounds represented by the following formula (I):

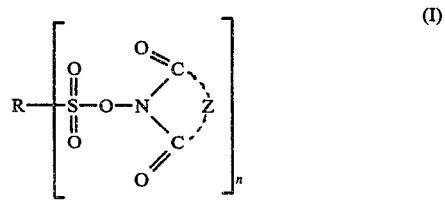

wherein R represents an $n$-valent organic group; Z represents an atomic group necessary to complete a 5- or 6-membered ring; and $n$ represents 1, 2 or 3.

DETAILED DESCRIPTION OF THE INVENTION

In the above formula (I), R may represent any organic group which is $n$-valent and, particularly, R represents a $C_1 - C_{10}$ hydrocarbon group or a substituted $C_1 - C_{10}$ hydrocarbon group; Z represents an atomic group necessary to form a 5- or 6-membered ring; and n represents 1, 2 or 3.

The hydrocarbon group represented by R can be any of a straight, branched, cyclic or unsaturated hydrocarbon group and examples include an alkyl group having 1 to 6 carbon atoms, such as methyl, ethyl, butyl, tert-butyl, hexyl, etc., an alkylene group having 1 to 6 carbon atoms, such as methylene, ethylene, butylene, etc., an aryl group, such as phenyl, etc., an arylene group, such as phenylene, etc., an alkenyl group having 2 to 6 carbon atoms, such as vinyl, etc., an alkenylene group having 2 to 6 carbon atoms, such as 2-butenylene, etc., and the like. Of these hydrocarbon groups, alkyl groups, alkylene groups, aryl groups, arylene groups and a vinyl group are particularly preferred.

Examples of substituents for R include one or more of alkoxy groups having 4 or less carbon atoms, such as methoxy or ethoxy, etc., halogen atoms, such as chlorine or bromine, etc., acyloxy groups having 7 or less carbon atoms, such as acetoxy, carboxylic acid amide groups having 4 or less carbon atoms, such as acetamide, etc., alkyl ester groups of carboxylic acids having 4 or less carbon atoms in the alkyl moiety, such as methoxycarbonyl, ethoxycarbonyl, etc., quaternary ammonium groups, for example, trialkyl ammonium groups having 1 to 4 carbon atoms in the alkyl moiety thereof, such as triethylammonium, etc., tertiary amino groups, for example, dialkylamino groups, such as diethylamino, etc., and salts of tertiary amino groups, such as the hydrochlorides, sulfates, p-toluenesulfonates, etc. Of these groups, alkoxy groups having 4 or less carbon atoms are particularly preferred.

Z represents an atomic group necessary to complete a 5- or 6-membered ring which can contain one or more hetero atoms such as nitrogen and oxygen in addition to carbon atoms. Examples of suitable 5- or 6-membered rings include the following groups:

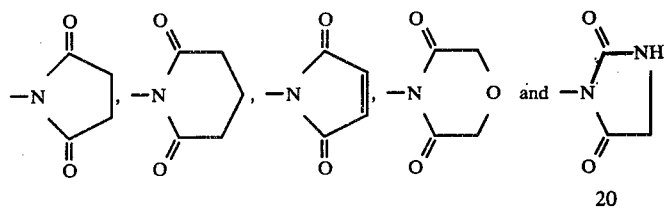

These heterocyclic groups can be substituted with substituents having a molecular weight of 70 or less (for example, alkyl groups having 4 or less carbon atoms or halogen atoms).

Further, n represents 1, 2 or 3 and 1 is particularly preferred for n.

The compounds used in the present invention, which are novel, can be synthesized in a good yield using known general processes. More specifically, they can be produced by reacting a corresponding n-valent sulfonic acid halide with a corresponding n-valent N-hydroxy compound in an organic solvent or an aqueous solution in the presence of an organic base, such as triethylamine, pyridine or 1,4-diazabicyclo-(2,2,2)-undecene, etc., or in the presence of an inorganic dehydrochlorinating agent, such as sodium carbonate or sodium hydroxide, etc.

The n-valent sulfonic acid halides (mainly, sulfonyl chloride) as starting materials are derived in most cases from the corresponding sulfonic acids or salts thereof. These n-valent sulfonic acids (or salts thereof) are known compounds, examples of which are as follows. Examples of monovalent sulfonic acids include methanesulfonic acid, ethanesulfonic acid, propanesulfonic acid, γ-chloropropanesulfonic acid, γ-methoxypropanesulfonic acid, γ-ethoxypropanesulfonic acid, δ-methoxybutanesulfonic acid, β-carbamoylethanesulfonic acid, p-chlorobenzenesulfonic acid, p-nitrobenzenesulfonic acid and m-carbamoylbenzenesulfonic acid. Examples of di- or tri-valent sulfonic acids are methionic acid, 1,2-ethanedisulfonic acid, 1,3-propanedisulfonic acid, 1,4-butanedisulfonic acid, 1,3-butanedisulfonic acid, 2-methyl-1,4-butanedisulfonic acid and 3-oxa-1,5-pentanedisulfonic acid. Examples of N-hydroxy compounds as the other starting material used include N-hydroxysuccinimide, N-hydroxyglutarimide, N-hydroxymaleinimide, N-hydroxymethylsuccinimide, N-hydroxymethoxysuccinimide and N-hydroxydiglycolic imide, etc.

Specific examples of the compound of the present invention are described below. However, the present invention is not to be construed as being limited to these examples only.

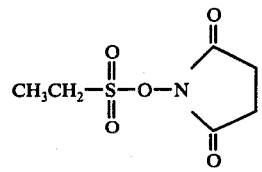(1)

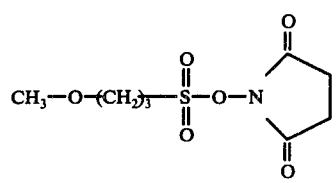(2)

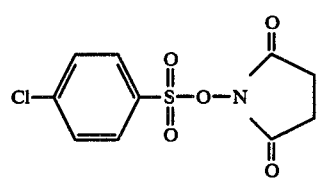(3)

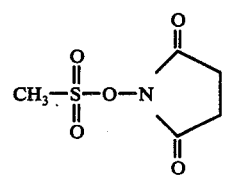(4)

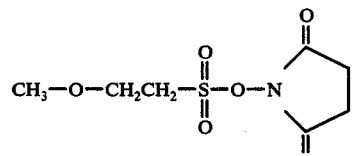(5)

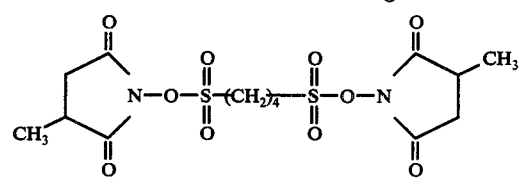(6)

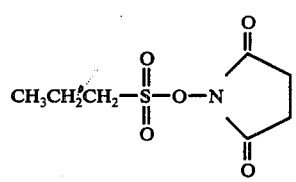(7)

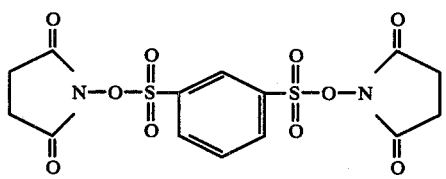(8)

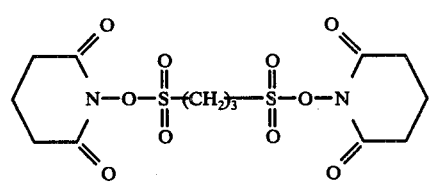(9)

-continued

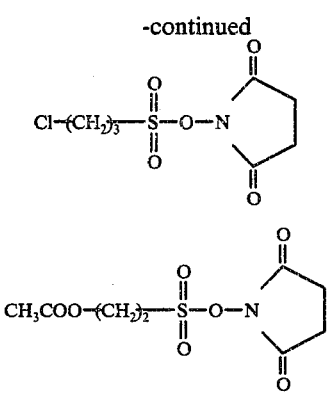

In the photographic light-sensitive materials produced using a hardening agent of the present invention of the formula (I), the strength of the gelatin films is established just after production of the light-sensitive materials, because the hardening agent of the present invention causes a rapid hardening reaction to occur and a post-hardening phenomenon does not occur. Accordingly, if the properties of the light-sensitive materials just after production are compared with those of light-sensitive materials after a lapse of a long time, no difference in apparent sensitivity and color balance caused by a difference in penetration rate of developing agents is observed.

Further, the hardening agent of the present invention is stable and has good storability even though it has a high hardening function and causes a rapid hardening reaction to occur. Furthermore, the hardening agent of the present invention neither reduces the effects of other photographic additives such as couplers for color photographic light-sensitive materials also present by interaction with such photographic additives nor is the hardening function of the compound of this invention lost. Moreover, the compound of this invention does not adversely influence the properties of the photographic light-sensitive materials (particularly, increase fog and reduce sensitivity).

Further, the hardening agent of the present invention does not increase the viscosity of gelatin solutions before formation of the films by coating the films after adding the hardening agent thereto, because while the compound of this invention causes a suitable hardening reaction nevertheless it does not give rise to a post-hardening phenomenon. Consequently, the compound of this invention can be advantageously used for mass production of photographic light-sensitive materials.

The amount of the hardening agent used in the present invention, when such is incorporated in a gelatin layer of a photographic material, can be suitably chosen depending on the purpose. Generally, a suitable amount ranges from about 0.05 to about 30% by weight, preferably 0.1 to 20% by weight, based on the weight of dry gelatin. A most preferred amount ranges from 0.5 to 10% by weight. If the amount of the hardening agent of the invention is above about 30% by weight based on the dry gelatin, it becomes impossible to form films from the aqueous solution of gelatin by, for example, coating or spray coating, because the aqueous solution of gelatin sometimes gelatinizes and hardens. On the other hand, if the amount is below about 0.05% by weight, although formation of the films can be carried out using the aqueous solution of gelatin, the resulting films do not sufficiently harden after drying and the strength of the film is insufficient. On the contrary, when the amount of the hardening agent is in the above-described range, the property of rapidly hardening the gelatin, which is a characteristic of the present invention, is sufficiently exhibited.

The hardening agent of the present invention can be used individually or two or more hardening agents of the present invention may be used as a mixture. Further, the hardening agent of this invention can be used together with other known hardening agents. Examples of known hardening agents with which the hardening agent can be used are, for example, aldehyde compounds, such as formaldehyde or glutaraldehyde, ketone compounds, such as diacetyl or cyclopentanedione, bis(2-chloroethylurea), 2-hydroxy-4,6-dichloro-1,3,5-triazine, reactive halogen containing compounds described in U.S. Pat. Nos. 3,288,775 and 2,732,303 and British Pat. Nos. 974,723 and 1,167,207, etc., divinylsulfone, 5-acetyl-1,3-diacryloylhexahydro-1,3,5-triazine, reactive olefinic compounds described in U.S. Pat. Nos. 3,635,718 and 3,232,763 and British Pat. No. 994,869, N-hydroxymethylphthalimide, N-methylol compounds described in U.S. Pat. Nos. 2,732,316 and 2,586,168, isocyanates described in U.S. Pat. No. 3,103,437, aziridine compounds described in U.S. Pat. Nos. 3,017,280 and 2,983,611, acid derivatives described in U.S. Pat. Nos. 2,725,294 and 2,725,295, carbodiimide compounds described in U.S. Pat. No. 3,100,704, epoxy compounds described in U.S. Pat. No. 3,091,537, isoxazole compounds described in U.S. Pat. Nos. 3,321,313 and 3,543,292, halocarboxyaldehydes, such as mucochloric acid, dioxane derivatives, such as dihydroxydioxane or dichlorodioxane, and inorganic hardening agents, such as chromium alum or zirconium sulfate, etc. Further, the hardening agents used in this invention can be used together with precursor type compounds, such as alkali metal bisulfite-aldehyde addition products, methylol derivatives of hydantoin or monohydric aliphatic nitroalcohols, etc. When the hardening agent of the present invention is used together with other hardening agent(s), the ratio thereof can be appropriately chosen depending on the purpose or effect desired.

Where the compounds of the present invention are used for light-sensitive layers of silver halide light-sensitive materials, any silver halide may be used. Namely, any of silver chloride, silver bromide, silver bromochloride, silver bromoiodide and silver iodobromochloride may be used without any limitation as to production, crystal habit or particle size of the silver halide.

The silver halide emulsions can be sensitized using conventional chemical sensitizers, such as gold compounds, such as chloroaurate or gold trichloride, etc., noble metal salts, such as a salt of platinum, palladium or iridium, etc., or sulfur compounds which form silver sulfide by reacting with silver salts.

Further, sensitizing dyes can be added to the silver halide emulsions and suitable sensitizing dyes can be chosen depending on the wavelength range to which the silver halide is to be sensitized, the sensitivity or use of the light-sensitive material, etc.

For the purpose of preventing a reduction in sensitivity and an occurrence of fog during preparation of the light-sensitive materials, during storage or during processing of the light-sensitive materials, various kinds of compounds may be added to the above-described photographic emulsions. Many known compounds, for example, heterocyclic compounds, mercury containing compounds, mercapto compounds, metal salts as well as 4-hydroxy-6-methyl-1,3,3a,7-tetrazaindene, 3-methylbenzothiazole and 1-phenyl-5-mercaptotetrazole can be used for such purposes.

Examples of suitable compounds capable of achieving the above are described in C. E. K. Mees and T. H. James, *The Theory of the Photographic Process*, 3rd Ed., pages 344 – 349, Macmillan Co., New York (1966) and in the following patents: U.S. Pat. Nos. 1,758,576, 2,110,178, 2,131,038, 2,173,628, 2,697,040, 2,304,962, 2,324,123, 2,394,198, 2,444,605 - 8, 2,566,245, 2,694,716, 2,697,099, 2,708,162, 2,728,663 - 5, 2,476,536, 2,824,001, 2,843,491, 2,886,437, 3,052,544, 3,137,577, 3,220,839, 3,226,231, 3,236,652, 3,251,691, 3,252,799, 3,287,135, 3,326,681, 3,420,688 and 3,622,339 and British Pat. Nos. 893,428, 403,789, 1,173,609 and 1,200,188.

The gelatin to which the hardening agent of the present invention can be applied includes the so-called alkali treated (lime treated) gelatin which is prepared by treatment in an alkali bath when the gelatin is extracted from collagen, acid treated gelatin which is prepared by treatment in an acid bath and enzyme treated gelatin as described in *Bull. Soc. Sci. Photo. Japan*, No. 16, page 30 (1966). Further, the hardening agent of the present invention can be applied to gelatin having a low molecular weight which is prepared by partially hydrolyzing the gelatin in a water bath with heating or by reacting with a protease.

The gelatin to which the hardening agent of the present invention can be applied may be partially replaced, if desired, by colloidal albumin, casein, cellulose derivatives, such as carboxymethyl cellulose or hydroxyethyl cellulose, etc., saccharose derivatives, such as agar, sodium alginate or starch derivatives, etc., or synthetic hydrophilic colloids, such as polyvinyl alcohol, poly-N-vinylpyrrolidone, acrylic acid copolymers, polyacrylamide or derivatives thereof or partially hydrolyzed products thereof, and also replaced by the so-called gelatin derivatives, namely, those wherein the amino groups, imino groups, hydroxy groups or carboxy groups as functional groups in the gelatin molecule are reacted with reactants having a group capable of reacting with such groups or graft polymers prepared by grafting the molecular chain of other high molecular weight materials thereto.

Examples of suitable reactants for producing the above-described gelatin derivatives include isocyanates, acid chlorides and acid anhydrides described in U.S. Pat. No. 2,614,928, acid anhydrides described in U.S. Pat. No. 3,118,766, bromoacetic acids described in Japanese Patent Publication 5514/64, phenyl glycidyl ethers described in Japanese Patent Publication 26845,67, vinyl sulfone compounds described in U.S. Pat. No. 3,132,945, N-allyl vinylsulfonamides described in British Pat. No. 861,414, maleinimide compounds described in U.S. Pat. No. 3,186,846, acrylonitriles described in U.S. Pat. No. 2,594,293, polyalkylene oxides described in U.S. Pat. No. 3,312,553, epoxy compounds described in Japanese Patent Publication 26845/67, acid esters described in U.S. Pat. No. 2,763,639 and alkane sultones described in British Pat. No. 1,033,189, etc.

Many descriptions concerning branching high molecular weight materials suitable for grafting to gelatin appear in U.S. Pat. Nos. 2,763,625, 2,831,767 and 2,956,884, *Polymer Letters*, 5, 595 (1967), *Phot. Sci. Eng.*, 9 148 (1965) and *J. Polymer Sci.*, A-1 9 3199 (1971). Polymers and copolymers of the so-called vinyl monomers, such as acrylic acid, methacrylic acid or the esters, amides or nitriles thereof, or styrene, etc., can be widely used as such materials. However, hydrophilic vinyl polymers having a certain degree of compatibility with gelatin, such as polymers and copolymers of acrylic acid, acrylamide, methacrylamide, hydroxyalkyl acrylates or hydroxyalkyl methacrylates, etc., are particularly preferred.

The term "gelatin" as used herein and in the appended claims is used to describe the various types of gelatins described above, gelatin derivatives as described above and replacements for gelatin described above.

In using the hardening agent of the present invention for photographic light-sensitive materials, synthetic polymer compounds, such as a latex of water dispersable vinyl polymers and particularly compounds which increase the dimensional stability of the photographic materials may be incorporated into photographic emulsion layers or other layers individually or as a mixture (of different kinds of polymers) or together with hydrophilic water permeable colloids. Examples of such polymers include many kinds of compounds, which are described in, for example, U.S. Pat. Nos. 2,376,005, 2,739,137, 2,853,457, 3,062,674, 3,411,911, 3,488,708, 3,525,620, 3,635,715, 3,607,290 and 3,645,740 and British Pat. Nos. 1,186,699 and 1,307,373. Of these compounds, copolymers and homopolymers of alkyl acrylates, alkyl methacrylates, acrylic acid, methacrylic acid, sulfoalkyl acrylates, sulfoalkyl methacrylates, glycidyl acrylate, glycidyl methacrylate, hydroxyalkyl acrylates, hydroxyalkyl methacrylates, alkoxyalkyl acrylates, alkoxyalkyl methacrylates, styrene, butadiene, vinyl chloride, vinylidene chloride, maleic acid anhydride and itaconic acid anhydride are generally used. If desired, the so-called graft type emulsion polymerization latexes which were prepared by emulsion polymerization of the above-described vinyl compounds in the presence of hydrophilic protective colloid high molecular weight materials may be used.

In using the gelatin hardening agent of the present invention for photographic light-sensitive materials, matting agents can be used together therewith. Examples of suitable matting agents are finely divided particles of water insoluble organic or inorganic compounds having an average particle size of about 0.2 $\mu$ to about 10 $\mu$, and preferably 0.3 $\mu$ to 5 $\mu$. Examples of organic compounds preferably used include water dispersable vinyl polymers, such as polymethyl acrylate, polymethyl methacrylate, polyacrylonitrile, acrylonitrile-α-methylstyrene copolymers, polystyrene, styrene-divinylbenzene copolymers, polyvinyl acetate, polyethylene carbonate and polytetrafluoroethylene, etc., cellulose derivatives, such as methyl cellulose, ethyl cellulose, cellulose acetate and cellulose acetate propionate, etc., starch derivatives, such as carboxymethyl starch, carboxynitrophenyl starch and ureaformaldehyde-starch reaction products, etc., gelatin which is hardened with known hardening agents and hardened gelatin prepared by coacervation to form finely divided capsular particles, etc. Examples of inorganic compounds which are preferably used include silicon dioxide, titanium dioxide, magnesium dioxide, aluminum dioxide, barium sulfate, calcium carbonate, silver chloride desensitized by known methods, silver bromide desensitized in the same manner as described above, and glass, etc. The above-described matting agents can be used, if desired, individually or as a mixture of two or more thereof.

In using the gelatin hardening agent of the present invention for photographic light-sensitive materials, couplers may be also used in combination therewith. In such cases, the so-called non-diffusible couplers are incorporated in silver halide emulsion layers. Examples of couplers which can be used are 4-equivalent diketomethylene type yellow couplers and 2-equivalent diketomethylene type yellow couplers, such as the compounds described in U.S. Pat. Nos. 3,415,652, 3,447,928, 3,311,476 and 3,408,194, etc., the compounds described in U.S. Pat. Nos. 2,875,057, 3,265,506, 3,409,439, 3,551,155, and 3,551,156, etc., and the compounds described in Japanese Patent Application (OPI) No. 26133/72 and Japanese Patent Publication No. 66836/73, etc.; 4-equivalent and 2-equivalent pyrazolone type magenta couplers and imidazolone type magenta couplers, such as the compounds described in U.S. Pat. Nos. 2,600,788, 2,983,608, 3,062,653, 3,214,437, 3,253,924, 3,419,391, 3,419,808, 3,476,560 and 3,582,322, Japanese Patent Publication No. 20636/70 and Japanese Patent Application (OPI) No. 26133/72; and α-naphthol type cyan couplers and phenol type cyan couplers such as the compounds described in U.S. Pat. Nos. 2,474,293, 2,698,794, 3,034,892, 3,214,437, 3,253,924, 3,311,476, 3,458,315 and 3,591,383 and Japanese Patent Publications Nos. 11304/67 and 32461/69. In addition, the compounds described in U.S. Pat. Nos. 3,227,554, 3,297,445, 3,253,924, 3,311,476, 3,379,529, 3,516,831, 3,617,291 and 3,705,801 and German Patent Application (OLS) 2,163,811 may be used.

Surface active agents may be added, individually or as a mixture thereof, to the photographic emulsions of the photographic light-sensitive materials to which the hardening agent of the present invention is applied. Although surface active agents are generally used as coating assistants, they are sometimes used for other purposes, for example, for emulsification, sensitization, improvement of photographic properties, prevention of electrostatic charging or prevention of adhesion, etc.

These surface active agents can be classified into natural surface active agents, such as saponin, nonionic surface active agents, such as alkylene oxide type, glycerin type, and glycidol type agents, etc., cationic surface active agents, such as higher alkylamines, quaternary ammonium salts, pyridine and other heterocyclic compounds, phosphonium or sulfonium compounds, etc., anionic surface active agents which contain acid groups, such as carboxylic acid, sulfonic acid, phosphoric acid, sulfuric acid ester or phosphoric acid ester groups, etc., and ampholytic surface active agents, such as amino acids, aminosulfonic acids, sulfuric acid esters or phosphoric acid esters of aminoalcohols, etc.

The photographic emulsions are coated on substantially planar support materials, for example, a rigid support, if desired, such as glass, metal or ceramic or a flexible support.

Examples of typical flexible supports include cellulose nitrate films, cellulose acetate films, cellulose acetate butyrate films, cellulose acetate propionate films, polystyrene films, polyethylene terephthalate films, polycarbonate films, laminated films of the above-described films, thin glass films, baryta coated paper, paper laminated or coated with α-olefin polymers and, particularly, with polymers or an α-olefin having 2 to 10 carbon atoms, such as polyethylene, polypropylene or an ethylene-butene copolymer, etc., and plastic films described in Japanese Patent Publication No. 19068/72, the surface of which is roughened so as to improve the adhesive property to other high molecular weight materials and to improve the printability thereof, which have been conventionally used for photographic light-sensitive materials.

In using the hardening agent of the present invention each layer of the photographic light-sensitive materials can be formed by various kinds of coating methods, such as dip coating, air-knife coating, curtain coating, spray coating or extrusion coating using a hopper described in U.S. Pat. No. 2,681,294.

If desired, two or more layers can be coated at the same time using the methods described in U.S. Pat. Nos. 2,761,791, 3,508,947, 2,941,898 and 3,526,528, etc.

In the method of this invention for hardening gelatin with the gelatin hardening agent of the formula (I) above, the processing of the gelatin or gelatin containing layer can be conducted at substantially any time, e.g., before coating of such a layer, after coating of such a layer, etc. Further, the hardening agent of the present invention may be used by adding such not only to light-sensitive materials but also to processing solutions. Suitable temperatures for the treatment of gelatin or gelatin layers with the hardening agent of this invention can range from about 10° to about 50° C. Where the hardening agent is used in a processing solution, a suitable amount of the hardening agent can range up to about 5% by weight, preferably 0.1 to 3% by weight, based on the processing solution.

Examples of the synthesis of the compounds of the formula (I) which can be used in the present invention and examples of the present invention are illustrated in greater detail below. Unless otherwise indicated, all parts, percents, ratios and the like are by weight.

SYNTHESIS EXAMPLE 1

Synthesis of Compound (1)

4.6 g of N-hydroxysuccinimide was dissolved in 80 ml of anhydrous acetone and a solution containing 5 g of ethane sulfonyl chloride in 20 ml of anhydrous acetone was added dropwise thereto with stirring. Further, 4 g of triethylamine and 20 ml of acetone were added dropwise thereto at below 0° C and the mixture was stirred for 3 hours. After further stirring at room temperature (about 20° – 30° C) for 2 hours, the mixture was filtered under suction and the filtrate was condensed under reduced pressure. 300 ml of ice water was added thereto to precipitate white crystals. After filtration and drying, 7.5 g of white needle-like crystals was obtained. Melting point: 140° C.

| Elemental Analysis | C | H | N |
|---|---|---|---|
| Calculated (%) | 34.78 | 4.35 | 6.76 |
| Found (%) | 34.56 | 4.42 | 6.77 |

SYNTHESIS EXAMPLE 2

Synthesis of Compound (2)

White crystals were obtained by reacting N-hydroxysuccinimide with γ-methoxy propanesulfonyl chloride in the same manner as in Synthesis Example 1. Melting point: 75° – 76° C.

The other compounds can be produced in the same manner as described above.

EXAMPLE 1

To an aqueous solution of gelatin containing 70 g of dry gelatin per liter of solution, the hardening agent of the present invention, as shown in the following table, was added. The mixture was applied uniformly to a cellulose triacetate film support having a subbing layer thereon and dried to form a layer having a thickness of about 10 μ. After the resulting sample was stored at 25° C under 55% RH for 20 days, the degree of swelling in water and the film surface strength were measured.

The value of the degree of swelling was obtained by measuring the film thickness after immersing the sample in water at 20° C for 10 minutes and dividing the increased value of the film thickness by the thickness of the dry gelatin film before immersion.

The film surface strength was measured by scratching the film surface using a stainless steel pin having a tip end radius of 0.4 mm after immersing the sample in water at 20° C for 10 minutes and represented as a value of the load (g) at which a scratch was formed on the film surface.

TABLE 1

Results of Measurement of Degree of Swelling in Example 1

| Hardening Agent | Amount (milli mol/ g gelatin) | Degree of Swelling (%) | Film Surface Strength (g) | Note |
|---|---|---|---|---|
| None | 0 | 10.3 | 2 | Control |
| Compound (1) | 0.08 | 5.7 | 18 | Present invention |
| Compound (2) | 0.08 | 5.6 | 20 | " |
| Compound (3) | 0.08 | 6.2 | 14 | " |
| Compound (4) | 0.08 | 5.7 | 18 | " |
| Compound (10) | 0.08 | 6.0 | 16 | " |

As can be understood from the results in Table 1, the compounds of the present invention have a hardening ability to prevent excess swelling of gelatin in water and to provide sufficient scratch resistance.

EXAMPLE 2

An emulsion prepared using a neutralization process containing 120 g of gelatin and 100 g of silver bromide per kg of the emulsion was divided into the following portions. After adding the hardening agent as described in the following table, each portion was coated uniformly on a cellulose triacetate support having a subbing layer thereon and dried to form a layer having a dry film thickness of about 10 μ. Further, a portion of the coating solution was removed and the increase of viscosity thereof was measured while holding the temperature at 40° C. The resulting sample film was stored at 25° C under 55% RH. After 1 day, 3 days, 7 days and 28 days from coating, the melting point of the emulsion layer in each case was measured. Further, the melting point of the emulsion layer of a sample film which was stored at 50° C under 80% RH for 2 days (accelerated conditions) was measured.

The melting point of the emulsion layer is the temperature at which the swollen emulsion layer began to melt when the sample film was immersed in a 2% aqueous solution of $Na_2CO_3$ the temperature of which was increased from 25° C at a rate of 1° C per minute.

TABLE 2

| Hardening Agent | Amount | Melting Point (° C) | | | | | Variation in Viscosity at 40° C | |
|---|---|---|---|---|---|---|---|---|
| | | 1 Day | 3 Days | 7 Days | 28 Days | Accelerated Conditions 2 Days | After 1 Hour | After 4 Hours |
| None | 0 | 34 | 34 | 34 | 34 | 35 | 30 | 31 |
| Mucochloric acid | 0.03 | 60 | 65 | 70 | 75 | 80 | 31 | 35 |
| Compound 1 | " | 69 | 70 | 70 | 71 | 72 | 40 | 43 |
| Compound 2 | " | 73 | 74 | 73 | 74 | 75 | 40 | 45 |
| Compound 3 | " | 63 | 64 | 64 | 65 | 65 | 35 | 39 |
| Compound 10 | " | 65 | 66 | 66 | 66 | 66 | 37 | 42 |

According to the results in Table 2, it can be understood that although mucochloric acid used for comparison has sufficient hardening ability, an unsuitable post-hardening, namely, the melting point varies with the lapse of time, occurred. On the contrary, the compounds of the present invention have sufficient hardening ability and cause very small variation in the melting point with the lapse of time to occur. Further, the hardening agent of this invention causes rapid hardening after film formation, yet does not make render coating of the aqueous solution of gelatin impossible because coagulation does not occur.

EXAMPLE 3

Coating samples prepared in Example 2 which were stored at 25° C under 55% RH for 30 days and those which were stored under accelerated conditions (50° C, 80% RH) for 2 days were exposed to a light wedge and developed at 20° C for 8 minutes using a developer having the following formulation:

N-Methyl-p-aminophenol Sulfate: 2 g
Sodium Sulfite (anhydrous): 100 g
Hydroquinone: 5 g
Borax (decahydrate): 2 g
Water to make: 1 l The samples were then subjected to sensitometric measurement. The results of the measurement are shown in Table 3 below.

TABLE 3

Results of Sensitometric Measurement in Example 3

| Hardening Agent | Amount (milli mol/ g gelatin) | Sample Stored under Room Temp. Condition | | Sample Stored under Accelerated Conditions | |
|---|---|---|---|---|---|
| | | Relative Sensitivity | Fog | Relative Sensitivity | Fog |
| None | 0 | 100 | 0.10 | 100 | 0.20 |
| Mucochloric acid | 0.03 | 93 | 0.08 | 90 | 0.25 |
| Compound 1 | 0.08 | 98 | 0.05 | 95 | 0.08 |
| Compound 2 | " | 98 | 0.08 | 95 | 0.08 |
| Compound 3 | " | 95 | 0.10 | 93 | 0.10 |
| Compound 10 | " | 96 | 0.09 | 94 | 0.10 |

As can be understood from the results in Table 3, the compounds of the present invention do not adversely influence the photographic properties from a practical standpoint.

While the invention has been described in detail and with reference to specific embodiments thereof, it will be apparent to one skilled in the art that various changes and modifications can be made therein without departing from the spirit and scope thereof.

What is claimed is:

1. A method of hardening gelatin which comprises treating gelatin with a compound represented by the formula (I):

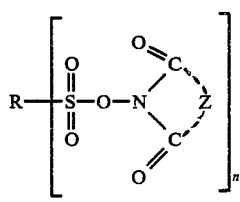

wherein R represents an n-valent organic group; Z represents an atomic group necessary to complete a 5- or 6-membered ring; and n represents 1, 2 or 3.

2. The method of claim 1, wherein the compound represented by the formula (I) is incorporated into a gelatin layer and the amount of the compound represented by the formula (I) to the gelatin ranges from about 0.05 to about 30% weight based on the weight of the dry gelatin.

3. The method of claim 1, wherein said treating of gelatin is with a processing solution containing the compound represented by the formula (I) and the processing solution contains about 5% by weight or less of said compound represented by the formula (I).

4. The method of claim 1, wherein said gelatin is alkali-treated gelatin, acid-treated gelatin, a partial hydrolysis product of gelatin, an enzymatic decomposition product of gelatin, a gelatin derivative in which the amino groups, imino groups, hydroxy groups or carboxy groups as functional groups in the gelatin molecule are reacted with another reactant containing a group capable of reacting with such groups, or a graft polymer of gelatin comprising the reaction product obtained on grafting a molecular chain of another high molecular weight material to gelatin.

5. The method of claim 1, wherein R represents a hydrocarbon group having 1 to 10 carbon atoms.

6. The method of claim 1, wherein R represents an alkyl group having 1 to 6 carbon atoms, an alkylene group having 1 to 6 carbon atoms, an aryl group, an arylene group, an alkenyl group having 2 to 6 carbon atoms or an alkenylene group having 2 to 6 carbon atoms, which may be unsubstituted or substituted with 1 or more of an alkoxy group having 4 or less carbon atoms, a halogen atom, an acyloxy group having 7 or less carbon atoms, a carboxylic acid amide group, an alkyl ester group of a carboxylic acid having 4 or less carbon atoms in the alkyl moiety, a quaternary ammonium group, a tertiary amino group or a tertiary amino salt group.

7. The method of claim 1, wherein Z is selected from the group consisting of:

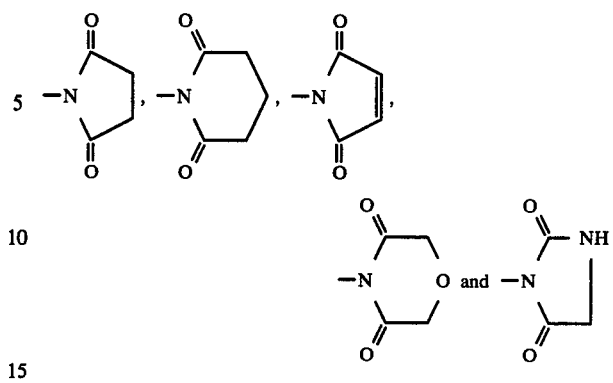

wherein the heterocyclic group comprising Z can be substituted with an alkyl group having 4 or less carbon atoms or a halogen atom.

8. The method of claim 1, wherein said compound represented by the formula (I) is:

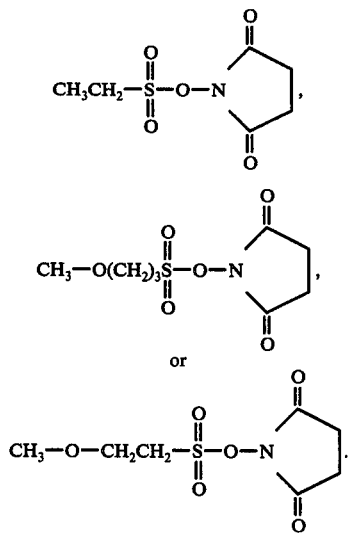

9. The method of claim 1, wherein R represents a $C_1$-$C_{10}$ hydrocarbon group.

10. The method of claim 1, wherein R represents an alkylene group having 1 to 6 carbon atoms substituted with an alkoxy group having 4 or less carbon atoms.

11. The method of claim 9, wherein Z is free of hetero atoms.

12. The method of claim 9, wherein Z is

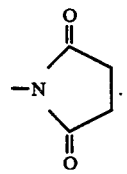

13. The method of claim 10, wherein Z is

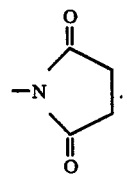

* * * * *